United States Patent [19]

Razzaghi

[11] Patent Number: 5,752,653
[45] Date of Patent: May 19, 1998

[54] PAPER CUP WITH AIR INSULATION

[76] Inventor: Mahmoud Razzaghi, 3740 Boyd Ave. #153, San Diego, Calif. 92111

[21] Appl. No.: 645,596

[22] Filed: May 13, 1996

[51] Int. Cl.[6] .................................................... B65D 3/22
[52] U.S. Cl. .......................... 229/403; 206/515; 229/4.5
[58] Field of Search ........................... 229/4.5, 400, 403; 220/408, 410, 446, 447; 206/499, 514, 515, 519, 520

[56] References Cited

U.S. PATENT DOCUMENTS

| | | | |
|---|---|---|---|
| 1,814,671 | 7/1931 | Dufour | 229/403 |
| 2,266,828 | 12/1941 | Sykes | 229/403 |
| 2,316,150 | 4/1943 | Amberg | 206/515 |
| 2,563,352 | 8/1951 | Morse | 229/403 |
| 2,695,744 | 11/1954 | Gattuso | 220/446 |
| 3,456,860 | 7/1969 | Janninck | 229/400 |
| 3,580,468 | 5/1971 | McDevitt | 229/400 |
| 3,648,888 | 3/1972 | Cheladze | 206/519 |
| 4,548,348 | 10/1985 | Clements | 206/514 |
| 5,145,107 | 9/1992 | Silver et al. | 229/403 |
| 5,524,817 | 6/1996 | Meier et al. | 229/4.5 |

FOREIGN PATENT DOCUMENTS 601517   8/1934   Germany ................................ 206/515

*Primary Examiner*—Gary E. Elkins

[57] ABSTRACT

A cup assembly with air insulation comprised of two regular paper cups one inside the other. Each cup has a truncated conical side wall with an outwardly rolled rim defining an opening at the larger end and a bottom wall at the smaller end. The inner cup is inserted from bottom side into the outer cup. The rolled rim of the inner cup pushes against the inside of the outer cup, and the bottom of the inner cup touches the bottom wall of the outer cup. The rolled rim of the inner cup maintains an air space between the side walls of the two cups. The contacts at the bottom and top provide support for the inner cup and maintain it in axial alignment with the outer cup. The contact pressure between the rim of the inner cup and the side wall of the outer cup essentially seals the air space for a more efficient thermal insulation and prevention of beverage leakage into the air space and also provides a frictional force that keeps the inner cup and the outer cup together. In a similar embodiment, the outer cup has an inwardly rolled rim which pushes against the outside of the inner cup.

11 Claims, 3 Drawing Sheets

PAPER CUP WITH AIR INSULATION

FIELD OF THE INVENTION

This invention relates to disposable cups for hot or cold beverages and foods, specially to paper cups for hot beverages.

BACKGROUND OF THE INVENTION

With hot beverages, regular paper cups become hot and uncomfortable to hold. This also poses the danger that user may drop the cup as a reflex to high temperature. Due to fast heat transfer, the beverage becomes cold fast.

Different cup assemblies have been devised to take advantage of air as an insulating medium for paper cups. These assemblies are generally inefficient or have high manufacturing cost or material consumption. The high cost of manufacturing is due to the requirement of special machinery and extra procedures for assembling. Besides, some of the assemblies have their own limitations too.

U.S. Pat. No. 5,385,260 by Gatcomb discloses a paper sleeve with longitudinal indentations. The sleeve is manufactured with a cup using adhesives. Since paper can not tolerate deep indentation there is not enough separation between the sleeve and the cup for efficient insulation. Besides, the sleeve does not have the preferred smooth surface of a regular cup for appearance and displaying printed information clearly.

In U.S. Pat. No. 5,226,585 by Varano a similar sleeve is assembled by the user on a cup. The sleeve and the cup are adhered to each other by two layers of cohesive previously deposited on them. Still the design has thermal inefficiency and non smooth surface.

U.S. Pat. No. 3,908,523 by Shikaya discloses a corrugated sleeve. This design provides a better protection for the hand but it uses excessive material and is not suitable for displaying printed information.

U.S. Pat. No. 5,363,982 by Sadlier and U.S. Pat. No. 5,092,485 by Lee provide a double walled cup with a corrugated inside layer. Although the performance is satisfactory, material consumption and manufacturing costs are high.

U.S. Pat. No. 5,145,107 by Silver et al discloses a double walled cup. The two walls approach each other towards the mouth of the cup where they come in contact. Although the invention uses smooth paper without any spacer between the walls, it requires especial machinery. The design is inefficient because it fails to provide an optimum air layer along the height of the cup. Besides, the cup still becomes hot near the top and uncomfortable to hold while for stability a cup should be held near the top.

U.S. Pat. No. 5,326,019 by Wolff describes a cylindrical double walled cup with an spacer between the walls. The patent does not fully describe the method of manufacturing and assembly, specifically how to construct the top rim with or without the spacer as seen in the figure. The sectional view in the figure shows that a single paper folds around the spacer at the top and extends down to the bottom. This is not possible with limitations in deformation of paper.

Also, some sleeves provide thermal protection for the hand but they do not insulate the contents of the cup because they have open ends which allow free convection of air around the cup.

These limitations make existing designs impractical for the cost sensitive and environmentally sensitive disposable cup market. Therefore, still plastic foam cups are mainly used for serving hot beverages instead of the environmentally safe, recyclable, and biodegradable paper cups. Regular paper cups, specifically those for hot beverages, are made of smooth cardboard paper with only a thin film of plastic for protection against liquids.

OBJECTS OF THE INVENTION

Accordingly, the objects of this invention include:

1. Providing a paper cup assembly with efficient air insulation that is cost effective and can be manufactured easily.

2. Having the cup assembly comprised of two separate cups that can be manufactured by existing standard equipment for low cost, easy, and fast production, and can be assembled by the user by simply inserting one cup inside the other.

3. Using the rolled rim of one of the cups as the spacer between the two cups.

4. Using frictional force between the rolled rim of one cup and the side wall of the other cup to keep the assembled cups together.

5. Providing a series of small, medium, large, and extra large size of regular cups with such a dimensional relation that the medium cup can be used as the outer cup for the small cup, the large cup can be used as the outer cup for the medium cup, and the extra large cup can be used as the outer cup for the large cup.

6. Providing an air layer around the inner cup for efficient insulation and hand protection along essentially all its height from bottom to top.

7. Using smooth paper without additional spacer for the paper cup assembly to save material and simplify manufacturing.

BRIEF DESCRIPTION OF THE INVENTION

In the first preferred embodiment of the invention, there is a cup assembly comprised of two regular paper cups one inside the other. Each cup has a truncated conical side wall with an outwardly rolled rim at the larger end and a bottom wall at the smaller end. The cone angle of the outer cup is preferably equal to or less than that of the inner cup. The inner cup is inserted from bottom end into the outer cup. The relative dimensions of the two cups are such that the rolled rim of the inner cup pushes against the inside of the outer cup below its rim, and the bottom of the inner cup touches the bottom wall of the outer cup. The rolled rim of the inner cup maintains an air space between the side walls of the two cups. The contacts at the bottom and top provide support for the inner cup and maintain it in axial alignment with the outer cup. The contact pressure between the rim of the inner cup and the side wall of the outer cup essentially seals the air space for a more efficient thermal insulation and prevention of beverage leakage into the air space and also provides a frictional force that keeps the inner cup and the outer cup together With proper dimensions in a series of small, medium, and large size of regular cups, the medium size cup can be used as the outer cup for the small cup, and the large cup can be used as the outer cup for the medium cup. Therefore, only one extra cup would be required as the outer cup for the large cup.

The second preferred embodiment of the invention is a cup assembly comprised of two paper cups one inside the other. Each cup has a truncated conical side wall and a bottom wall at the smaller end. At the larger end, the inner cup has an outwardly rolled rim and the outer cup has an inwardly rolled rim. The cone angle of the outer cup is preferably equal to or less than that of the inner cup. The inner cup is inserted from bottom end into the outer cup. The relative dimensions of the two cups are such that the rolled rim of the outer cup pushes against the outside of the inner cup below its rim, and the bottom of the inner cup touches the bottom wall of the outer cup. The rolled rim of the outer cup maintains an air space between the side walls of the two cups. The contacts at the bottom and top provide support for the inner cup and maintain it in axial alignment with the outer cup. The contact pressure between the rim of the outer cup and the side wall of the inner cup essentially seals the air space for a more efficient thermal insulation and also provides a frictional force that keeps the inner cup and the outer cup together.

DETAILED DESCRIPTION OF THE INVENTION

Figure 1:
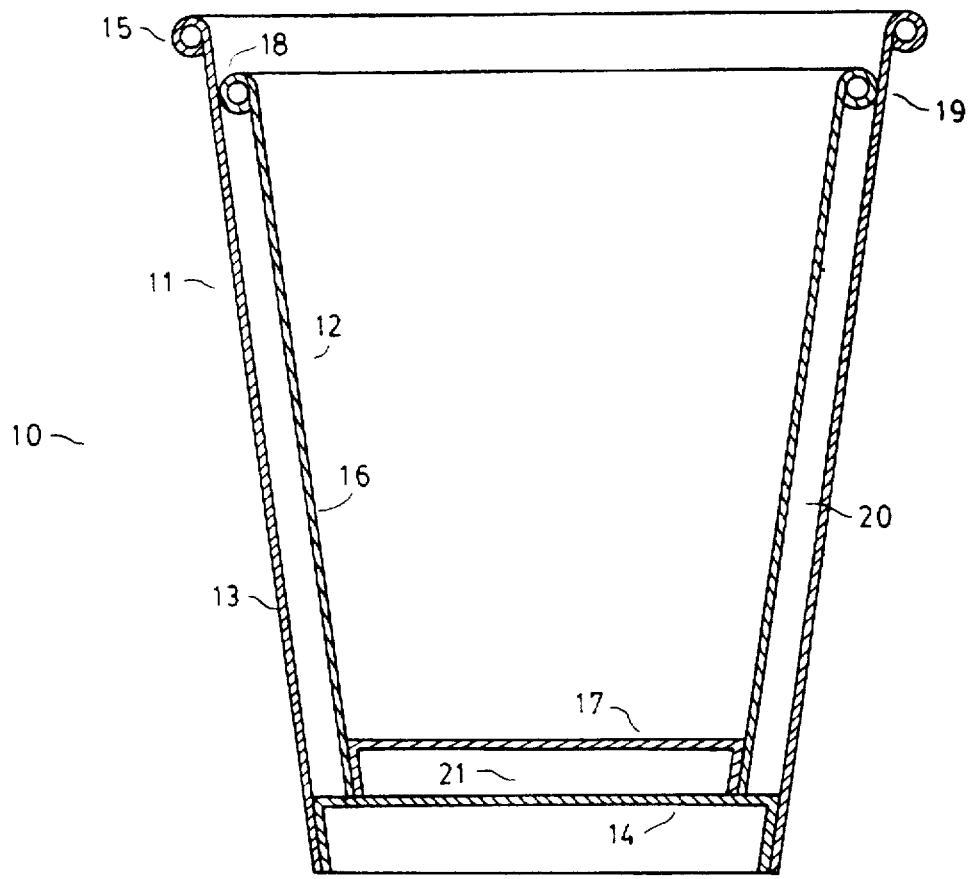
FIG. 1 is a sectional view the first preferred embodiment of the invention.

In the first preferred embodiment of the invention, FIG. 1, there is a cup assembly 10 comprised of an outer cup 11 and an inner cup 12. Cup 11 is a regular cup and has a truncated conical shape with side wall 13. The smaller end of cup 11 is closed and sealed by bottom wall 14. The larger end of cup 11 is rolled outwardly to provide rim 15. Cup 12 is a regular cup and has a truncated conical shape with side wall 16. The smaller end of cup 12 is closed and sealed by bottom wall 17. The larger end of cup 12 is rolled outwardly to provide rim 18. The cone angle of outer cup 11 is preferably equal to or less than that of inner cup 12.

Inner cup 12 is inserted from bottom end into the outer cup 11. The relative dimensions of the two cups are such that rolled rim 18 of inner cup 12 pushes against the inside of outer cup 11 at contact area 19 below rim 15, and the bottom end of side wall 16 touches bottom wall 14 of outer cup 11. Rolled rim 18 of inner cup 12 maintains air space 20 between side walls 13 and 16. Extension of side wall 16 beyond bottom wall 17 provides air space 21 between bottom walls 14 and 17. The contacts between the two cups at the top and bottom provide support for inner cup 12 and maintain it in axial alignment with outer cup 11. The contact pressure between rolled rim 18 and side wall 13 provides a frictional force that keeps outer cup 11 and inner cup 12 together. The pressured contact between rolled rim 18 and side wall 13 essentially prevents leakage of beverage into air space 20.

Air spaces 20 and 21 between cups 11 and 12 are essentially closed and reduce heat transfer between the contents of cup assembly 10 and the surrounding environment. This is specifically good for keeping beverages warm or cold for a longer time. Also due to reduced heat transfer, outer cup 11 does not get hot from the contents of inner cup 12 and the hand can hold cup assembly 10 comfortably without feeling excessive heat or burning.

Cup 12 receives the beverage and the hand holds cup 11. The weight of the beverage further helps keep cup 12 in place inside cup 11. A regular disposable cap may be kept on cup assembly 10 by the help of rim 15.

Air space 20 surrounds inner cup 12 along essentially all its height with a minimum thickness of about the diameter of rolled rim 15 which is approximately 3 mm. Therefore, the hand can hold cup 11 comfortably in any position and there is no preferred holding position.

An important and inseparable feature of the first preferred embodiment of the invention is providing single regular paper cups with such a dimensional relation that one cup can fit inside the other while having some contact pressure between the rolled rim of the inner cup and the side wall of the outer cup to keep the two cups together through frictional forces and at the same time provide an air space at least between the side walls of the two cups.

With the above provision in a series of small, medium, large, and extra large size of regular cups, the medium cup can be used as the outer cup for the small cup, the large cup can be used as the outer cup for the medium cup, and the extra large cup can be used as the outer cup for the large cup.

Since heat transfer through the bottom of cup assembly 10 is not critical, air space 21 may be eliminated by having bottom wall 17 at the extreme end of side wall 16. In this case, end wall 17 would be in contact with end wall 14. This will also reduce the overall height of cup assembly 10 and save some space and material.

A major advantage of this invention is that cups 11 and 12 are regular cups and are manufactured on existing standard paper cup machinery. Cups 11 and 12 can be supplied separately and assembled easily by the user. This eliminates the need for extra, complicated, and special assembly equipment. However, cup 10 may be assembled as part of the manufacturing process. Also, adhesives may be used to join outer cup 11 and inner cup 12 at contact areas.

Figure 2:
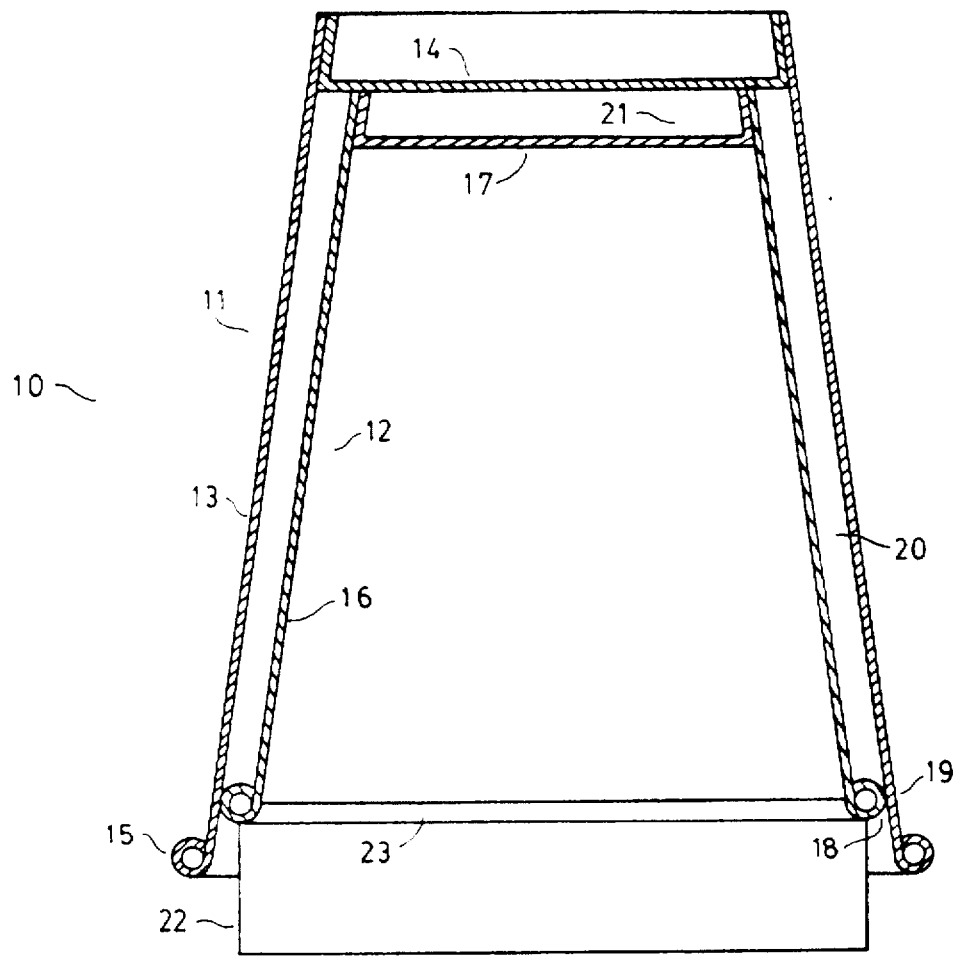
FIG. 2 is a sectional view of a preferred assembly device and procedure for the first preferred embodiment of the invention.

Although the assembly can be performed by hand only, a simple assembly device and procedure is shown in FIG. 2 to prevent contact between hand and the inside of the cups. According to FIG. 2 there is a plunger 22 with a shoulder 23 that can receive rim 18. Inner cup 23 is placed upside down on plunger 22 with rim 18 at shoulder 23. Then outer cup 11 is pushed upside down over inner cup 12. As another way of using plunger 22, inner cup 12 may be simply dropped into outer cup 11 and then pushed in place by plunger 22.

A plunger with concentric shoulders may be used for different sizes of cups. Also a plunger without shoulder that can go inside the inner cup may be used to push the inner cup into the outer cup.

Figure 3:
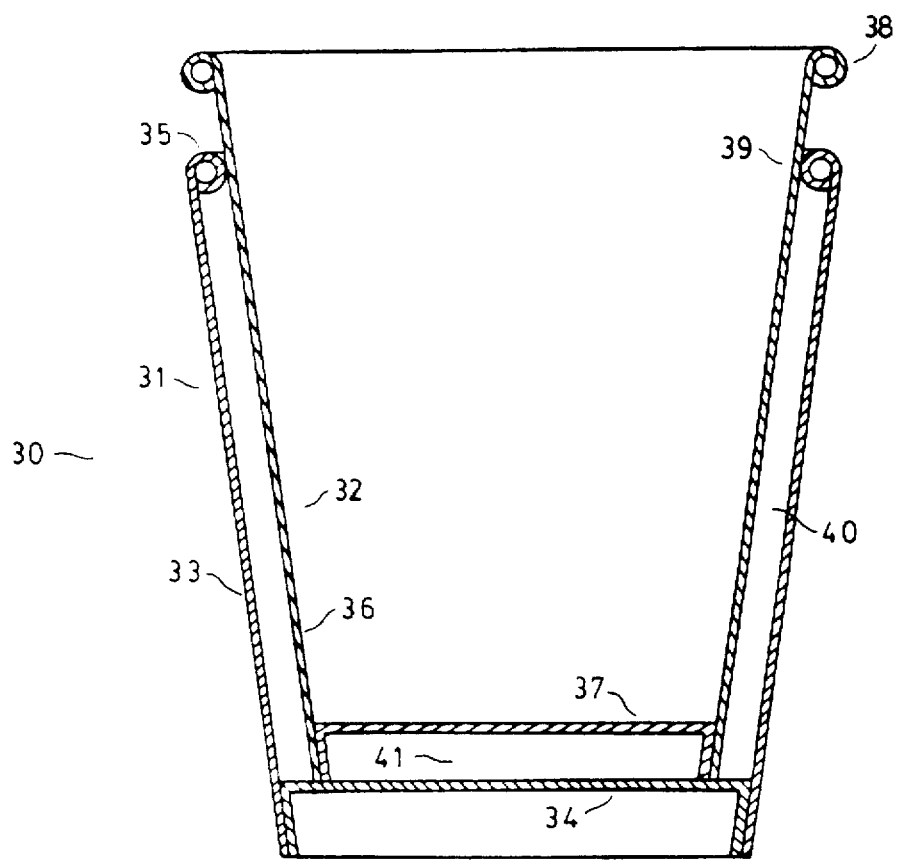
FIG. 3 is a sectional view of the second preferred embodiment of the invention.

In the second preferred embodiment of the invention, FIG. 3, there is a cup assembly 30 comprised of an outer cup 31 and an inner cup 32. Cup 31 has a truncated conical shape with side wall 33. The smaller end of cup 31 is closed and sealed by bottom wall 34. The larger end of cup 31 is rolled inwardly to provide rim 35. Cup 32 is a regular cup and has a truncated conical shape with side wall 36. The smaller end of cup 32 is closed and sealed by bottom wall 37. The larger end of cup 32 is rolled outwardly to provide rim 38. The cone angle of outer cup 31 is preferably equal to or less than that of inner cup 32.

Inner cup 32 is inserted from bottom end into the outer cup 31. The relative dimensions of the two cups are such that rolled rim 35 of outer cup 31 pushes against the outside of inner cup 32 at contact area 39 below rim 38, and the bottom end of side wall 36 touches bottom wall 34 of outer cup 31. Rolled rim 35 of outer cup 31 maintains air space 40 between side walls 33 and 36. Extension of side wall 36 beyond bottom wall 37 provides air space 41 between bottom walls 34 and 37. The contacts between the two cups at the bottom and top provide support for the inner cup 32 and maintain it in axial alignment with outer cup 31. The contact pressure between rolled rim 35 and side wall 36 provides a frictional force that keeps outer cup 31 and inner cup 32 together.

Air spaces 40 and 41 between cups 31 and 32 are essentially closed and reduce heat transfer between the contents of cup assembly 30 and the surrounding environment. This is specifically good for keeping beverages warm or cold for a longer time. Also due to reduced heat transfer, outer cup 31 does not get hot from the contents of inner cup 32 and the hand can hold cup assembly 30 comfortably without feeling excessive heat or burning.

Cup 32 receives the beverage and the hand holds cup 31. The weight of the beverage further helps keep cup 32 in place inside cup 31. A regular disposable cap may be kept on cup assembly 30 by the help of rim 38.

Air space 40 separates inner cup 32 from outer cup 31 along essentially all its height with a minimum thickness of about the diameter of rolled rim 35 which is approximately 3 mm. Therefore, the hand can hold cup 31 comfortably in any position and there is no preferred holding position.

Since heat transfer through the bottom of cup assembly 30 is not critical, air space 41 may be eliminated by having bottom wall 37 at the extreme end of side wall 36. In this case, end wall 37 would be in contact with end wall 34. This will also reduce the overall height of cup assembly 30 and save some space and material.

A major advantage of this invention is that cups 31 and 32 are manufactured on existing standard paper cup machinery. Cups 31 and 32 can be supplied separately and assembled easily by the user. This eliminates the need for extra, complicated, and special assembly equipment. However, cup 30 may be assembled as part of the manufacturing process. Also, adhesives may be used to join outer cup 31 and inner cup 32 at contact areas.

In both embodiments, the inner and outer cups have sufficient flexibility to maintain proper contact pressure without buckling within the dimensional tolerance of regular paper cups. Therefore, extra manufacturing, accuracy is not required.

Also, the cup assembly is stronger than a single cup with same paper thickness. Since the insulating effect of the paper is not critical in the air insulated cup assembly, the added strength allows the use of thinner paper to save material.

The invention may also be applied to disposable plastic cups.

I claim:

1. A paper cup assembly with air insulation for serving hot or cold beverage or food, the cup assembly comprises:

an inner cup to receive the beverage or food, the inner cup has a side wall and a bottom wall, the side wall is a truncated cone with inside and outside surfaces and circular top and bottom ends, the top end is larger than the bottom end, the top end defines an opening and has an outwardly rolled rim the bottom end is closed and sealed with the bottom wall;

an outer cup, the outer cup has a side wall and a bottom wall, the side wall is a truncated cone with inside and outside surfaces and circular top and bottom ends, the top end is larger than the bottom end, the top end defines an opening, the bottom end is closed and sealed with the bottom wall;

the inner cup is inserted from the bottom end into the outer cup;

the outer cup has an outwardly rolled rim, the rolled rim of the inner cup makes contact with and pushes against the inside surface of the side wall of the outer cup, the push provides a frictional force that keeps the inner cup and the outer cup together, the rolled rim of the inner cup maintains and seals an air space between the side walls of the inner cup and the outer cup for efficient thermal insulation and prevention of liquid leakage into the air space, or;

the outer cup has an inwardly rolled rim, the rolled rim of the outer cup pushes against the outside surface of the side wall of the inner cup, the push provides a frictional force that keeps the inner cup and the outer cup together, the rolled rim of the outer cup maintains and seals an air space between the side walls of the inner cup and the outer cup for efficient thermal insulation.

2. The cup assembly of claim 1 wherein the inner and outer cups are supplied separately to be assembled by the user.

3. The cup assembly of claim 1 wherein the inner and outer cups are joined with adhesive.

4. The cup assembly of claim 1 wherein the inner cup is the small size cup and the outer cup is the medium size cup from a series of small, medium, large, and extra large size cups with outwardly rolled rims, or, the inner cup is the medium size cup and the outer cup is the large size cup from a series of small, medium, large, and extra large size cups with outwardly rolled rims, or, the inner cup is the large size cup and the outer cup is the extra large size cup from a series of small medium, large, and extra large size cups with outwardly rolled rims.

5. The cup assembly of claim 1 wherein the bottom wall of the inner cup is above the bottom end of the side wall of the inner cup and there is an air space between the bottom walls of the inner cup and the outer cup.

6. The cup assembly of claim 1 wherein the bottom wall of the inner cup is at the bottom end of the side wall of the inner cup.

7. The cup assembly of claim 1 wherein the bottom end of the inner cup is in contact with the bottom wall of the outer cup.

8. The cup assembly of claim 1 wherein the inner cup or the outer cup is made of cardboard paper.

9. The cup assembly of claim 1 wherein the inner cup or the outer cup is made of a cardboard paper that has a protective plastic film at least on one side.

10. The cup assembly of claim 1 wherein the inner and outer cups are assembled with the help of a plunger, the plunger is a piece of material that provides support for the inner cup so the inner cup can be pushed into the outer cup.

11. The cup assembly of claim 10 wherein the plunger has at least one shoulder to receive and support the rolled rim of the inner cup.

* * * * *